US010576470B2

(12) United States Patent
Hadwen

(10) Patent No.: US 10,576,470 B2
(45) Date of Patent: Mar. 3, 2020

(54) ACTIVE MATRIX EWOD DEVICE AND METHOD OF DRIVING THEREOF

(71) Applicant: Sharp Microfluidic Solutions Limited, Oxford (GB)

(72) Inventor: Benjamin James Hadwen, Oxford (GB)

(73) Assignee: Sharp Life Science (EU) Limited, Oxford (GB)

(*) Notice: Subject to any disclaimer, the term of this patent is extended or adjusted under 35 U.S.C. 154(b) by 348 days.

(21) Appl. No.: 15/527,839

(22) PCT Filed: Jan. 7, 2016

(86) PCT No.: PCT/JP2016/000063
§ 371 (c)(1),
(2) Date: May 18, 2017

(87) PCT Pub. No.: WO2016/111251
PCT Pub. Date: Jul. 14, 2016

(65) Prior Publication Data

US 2017/0320059 A1 Nov. 9, 2017

(30) Foreign Application Priority Data

Jan. 8, 2015 (GB) .................................. 1500262.9

(51) Int. Cl.
*G01N 27/453* (2006.01)
*B01L 3/00* (2006.01)

(52) U.S. Cl.
CPC ... *B01L 3/502792* (2013.01); *B01L 3/502707* (2013.01); *B01J 2219/00653* (2013.01);
(Continued)

(58) Field of Classification Search
CPC .................... B01L 3/502784; B01L 3/502792
See application file for complete search history.

(56) References Cited

U.S. PATENT DOCUMENTS

| | | | |
|---|---|---|---|
| 6,911,132 B2 | 6/2005 | Pamula et al. | |
| 8,173,000 B1 * | 5/2012 | Hadwen | B01L 3/50273 204/450 |

(Continued)

FOREIGN PATENT DOCUMENTS

| | | |
|---|---|---|
| JP | 2008-529009 A | 7/2008 |
| JP | 2009-162983 A | 7/2009 |

(Continued)

OTHER PUBLICATIONS

Dak et al., "Non-Faradaic impedance characterization of an evaporating droplet for microfluidic and biosensing applications," Lab Chip, 2014, 14, 2469-2479 (Year: 2014).*

(Continued)

*Primary Examiner* — Alexander S Noguerola
(74) *Attorney, Agent, or Firm* — Renner, Otto, Boisselle & Sklar, LLP

(57) ABSTRACT

An AM-EWOD device comprises: first and second substrates (72,36); first and second array element electrodes (38A, 38B) disposed on the first substrate (72) and defining first and second array elements in the AM-EWOD device; a reference electrode (28) disposed on the first substrate (72); a sensor; and a reference electrode drive circuit (50). The reference electrode drive circuit (50) is configured to drive the reference electrode with a first voltage waveform for actuating an array element or with a second voltage waveform different from the first voltage waveform when performing a sensing operation.

14 Claims, 17 Drawing Sheets

(52) U.S. Cl.
CPC .................. *B01L 2300/0816* (2013.01); *B01L 2300/0887* (2013.01); *B01L 2300/161* (2013.01); *B01L 2400/0427* (2013.01)

(56) References Cited

U.S. PATENT DOCUMENTS

| | | | | |
|---|---|---|---|---|
| 2004/0055891 A1* | 3/2004 | Pamula | ............... | B01F 11/0071 205/98 |
| 2006/0194331 A1 | 8/2006 | Pamula et al. | | |
| 2007/0138016 A1* | 6/2007 | Wang | ................ | B01L 3/502792 204/600 |

FOREIGN PATENT DOCUMENTS

| | | |
|---|---|---|
| JP | 2012-176397 A | 9/2012 |
| JP | 2014-109581 A | 6/2014 |
| WO | WO 2008101194 | 8/2008 |
| WO | WO 2016110901 | 7/2016 |

OTHER PUBLICATIONS

Extended European Search Report of EP Application No. 16734991.9 dated Dec. 1, 2017, 7 pages.
International Search Report and Written Opinion for corresponding International application No. PCT/JP16/000063, dated Mar. 29, 2016.

* cited by examiner

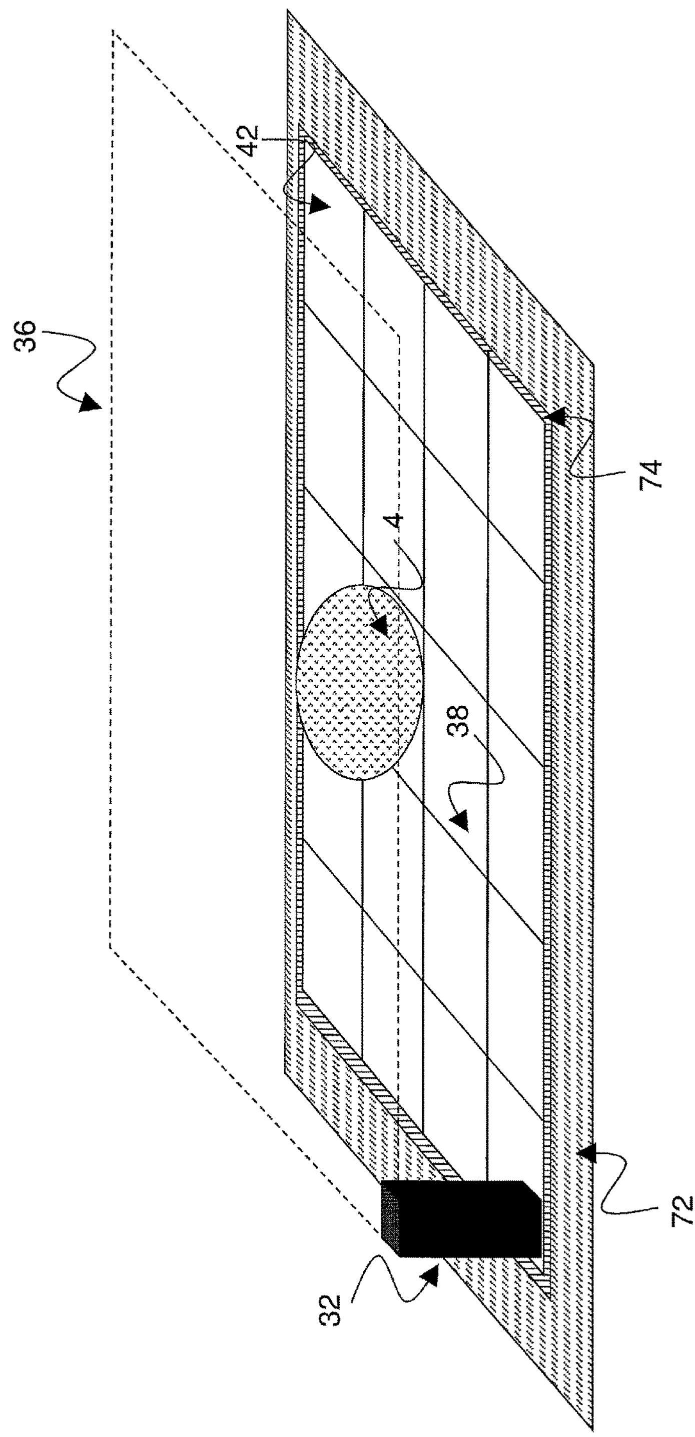
Figure 3: First embodiment

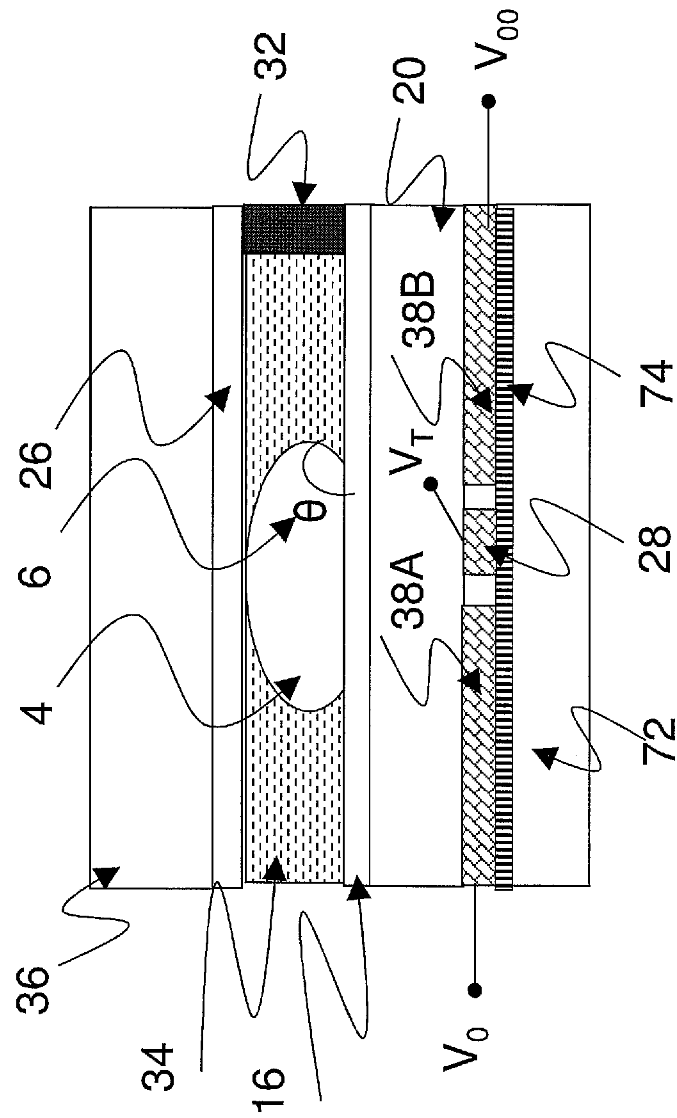
Figure 4: First embodiment

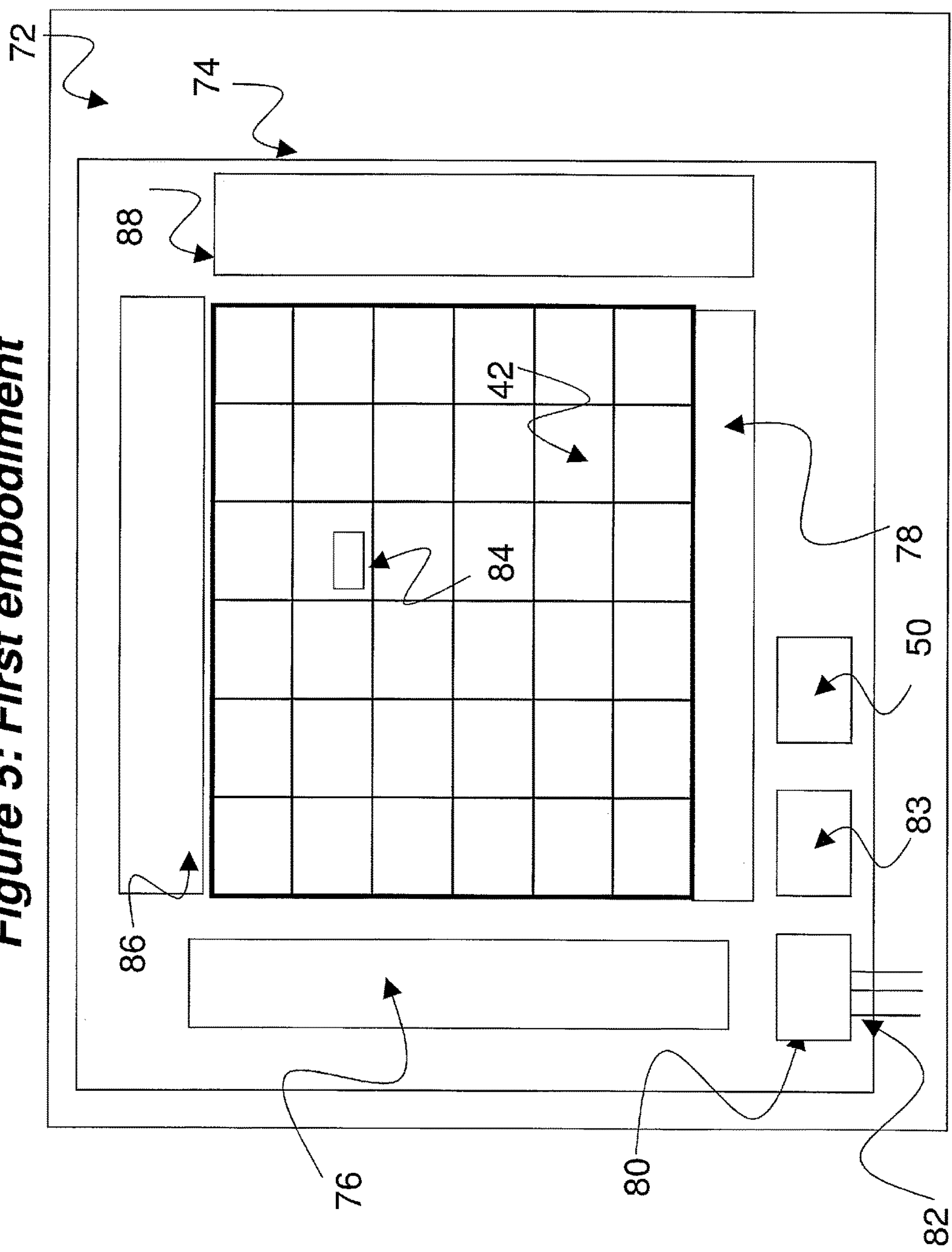
Figure 5: First embodiment

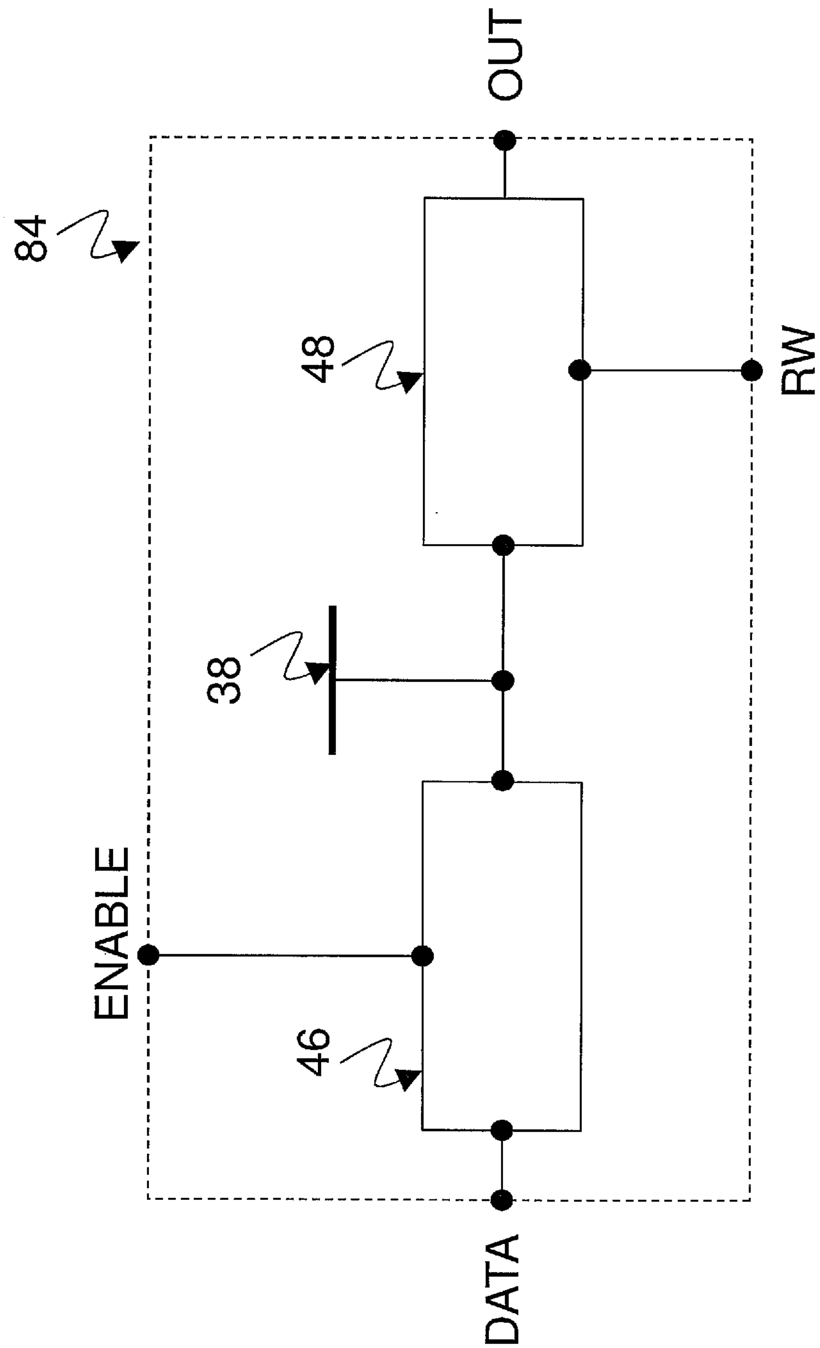
*Figure 6: First embodiment*

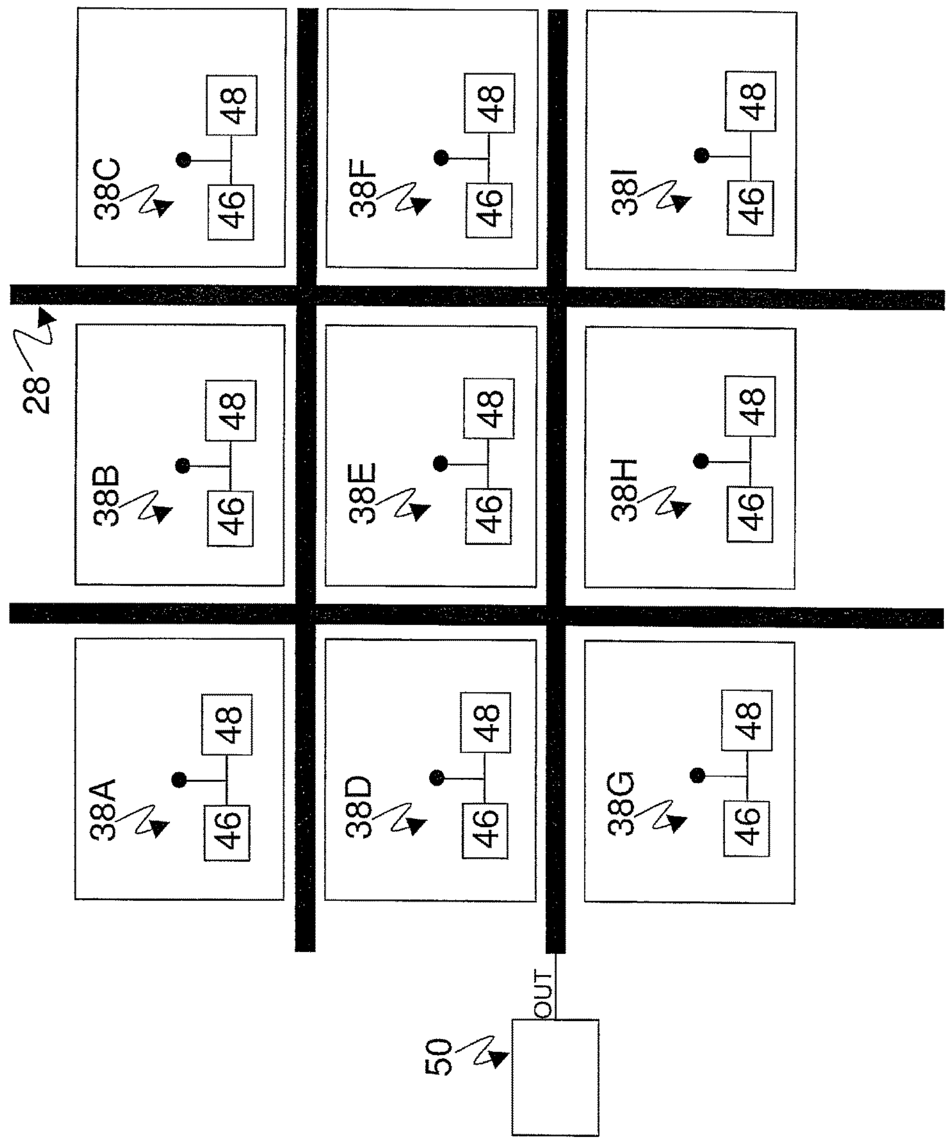
Figure 7: First embodiment

*Figure 8: 1st embodiment*
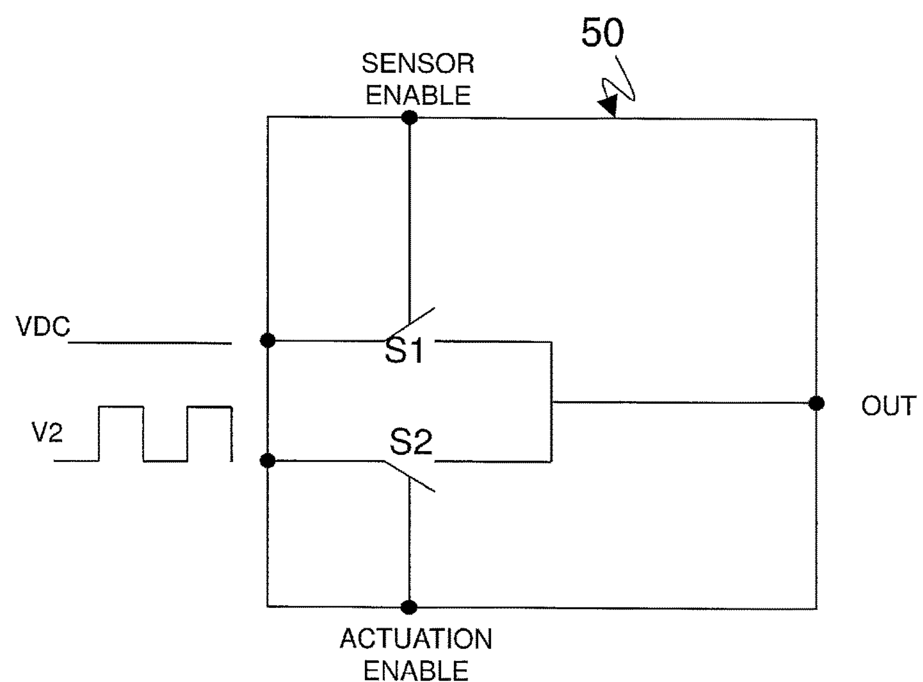

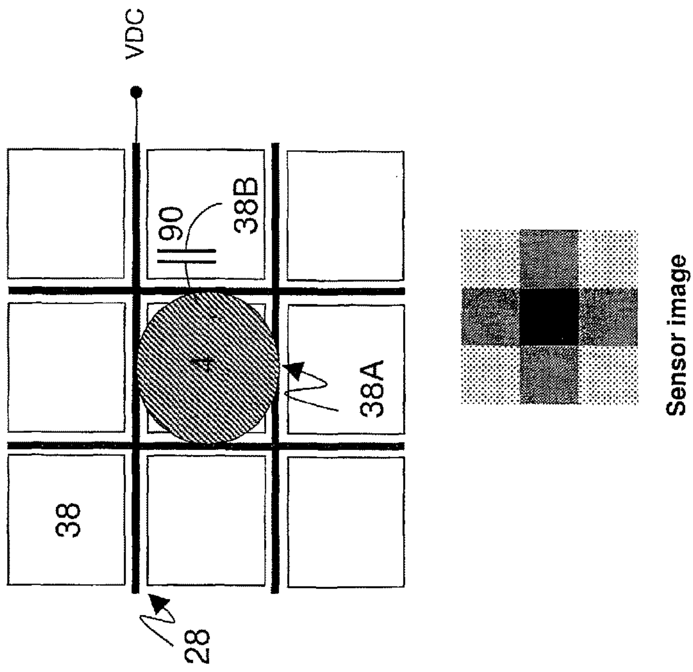
Figure 9B: In-plane reference electrode of this invention
VDC
38
38A
38B
90
4
28
Sensor image
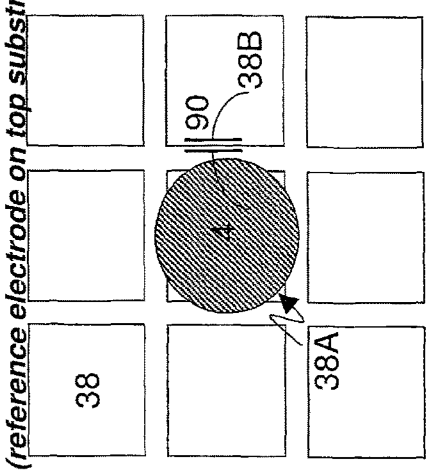
Figure 9A: Standard arrangement
(reference electrode on top substrate)
38
38A
38B
90
4
Sensor image

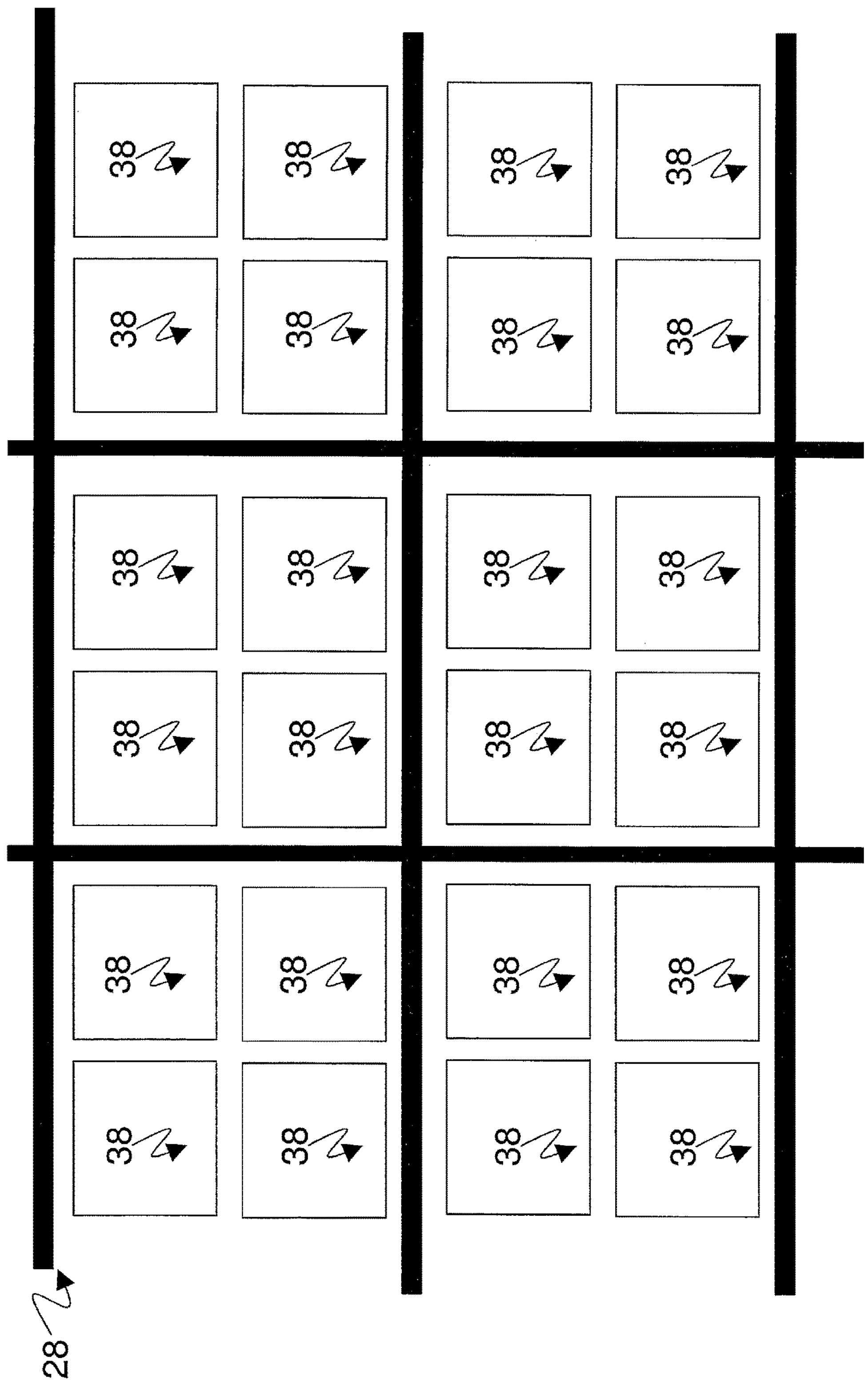
Figure 10: Second embodiment

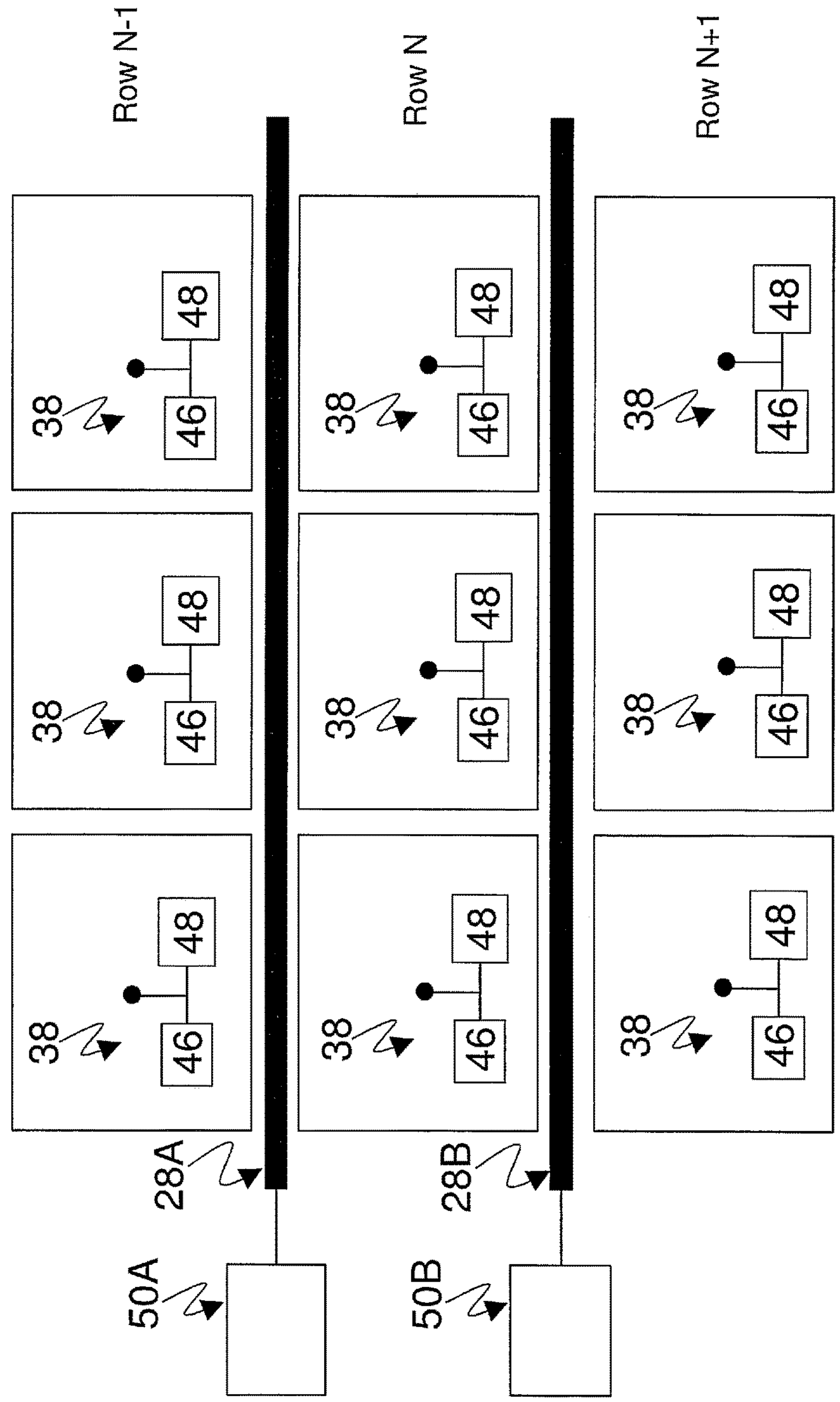
*Figure 11: Third embodiment*

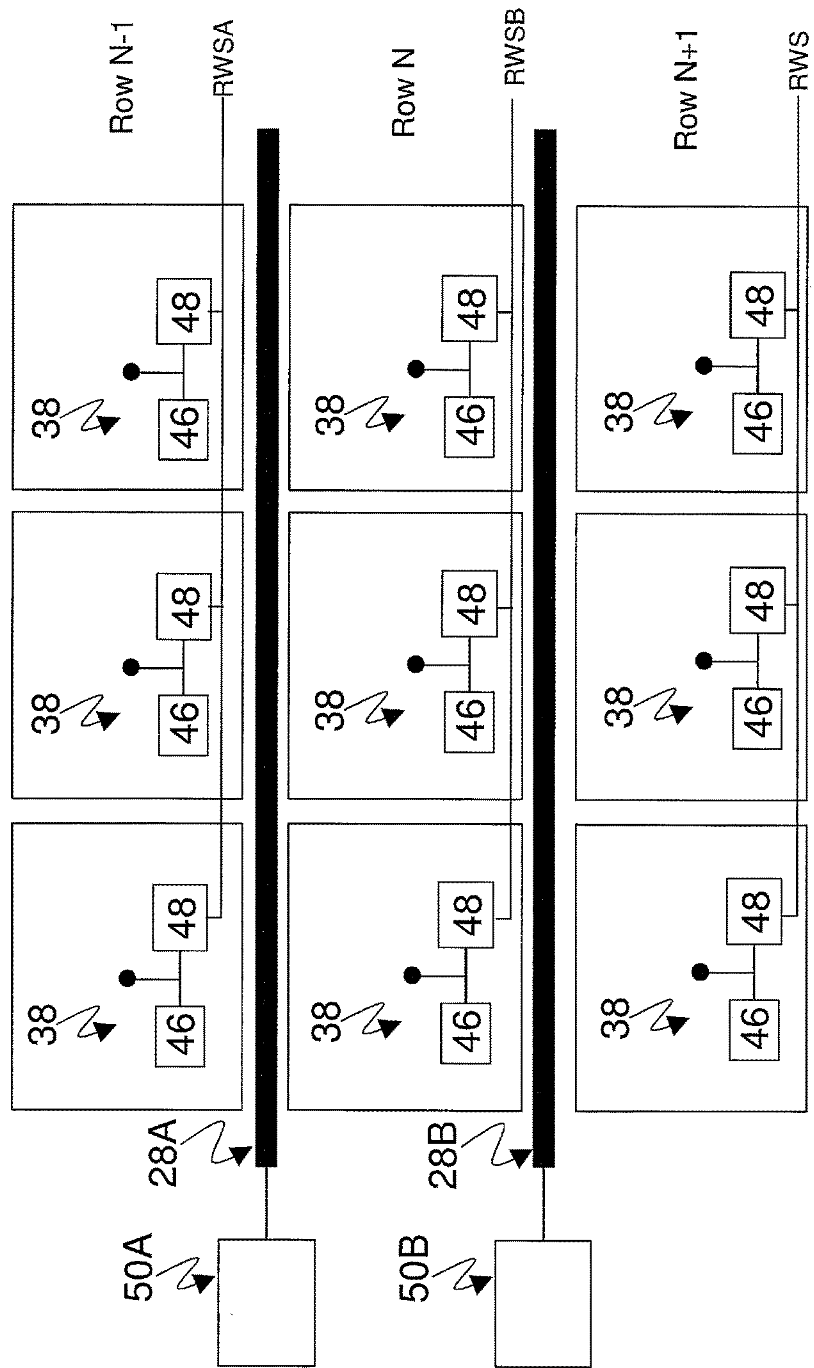
*Figure 12: Fourth embodiment*

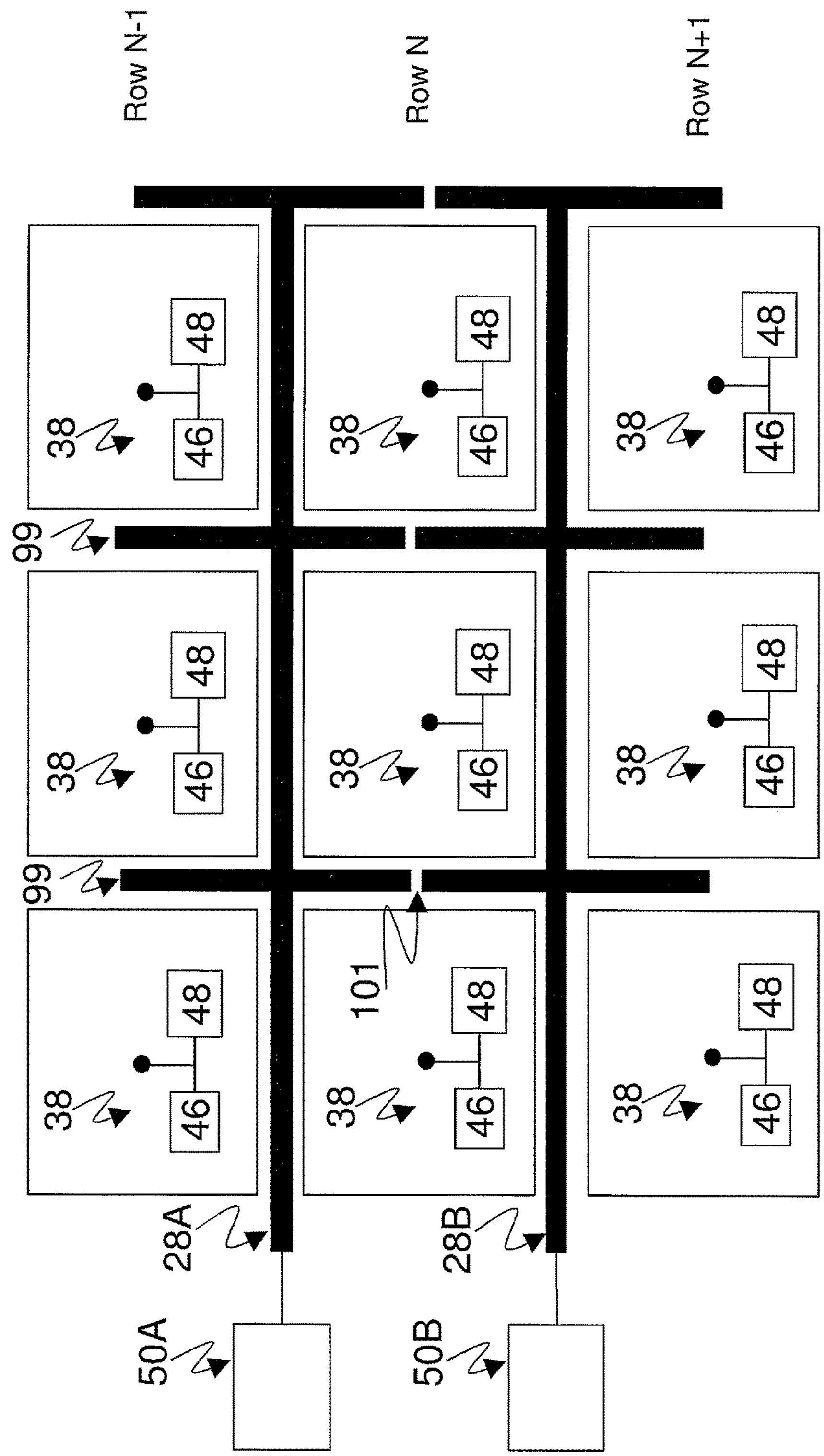
Figure 13: Fifth embodiment

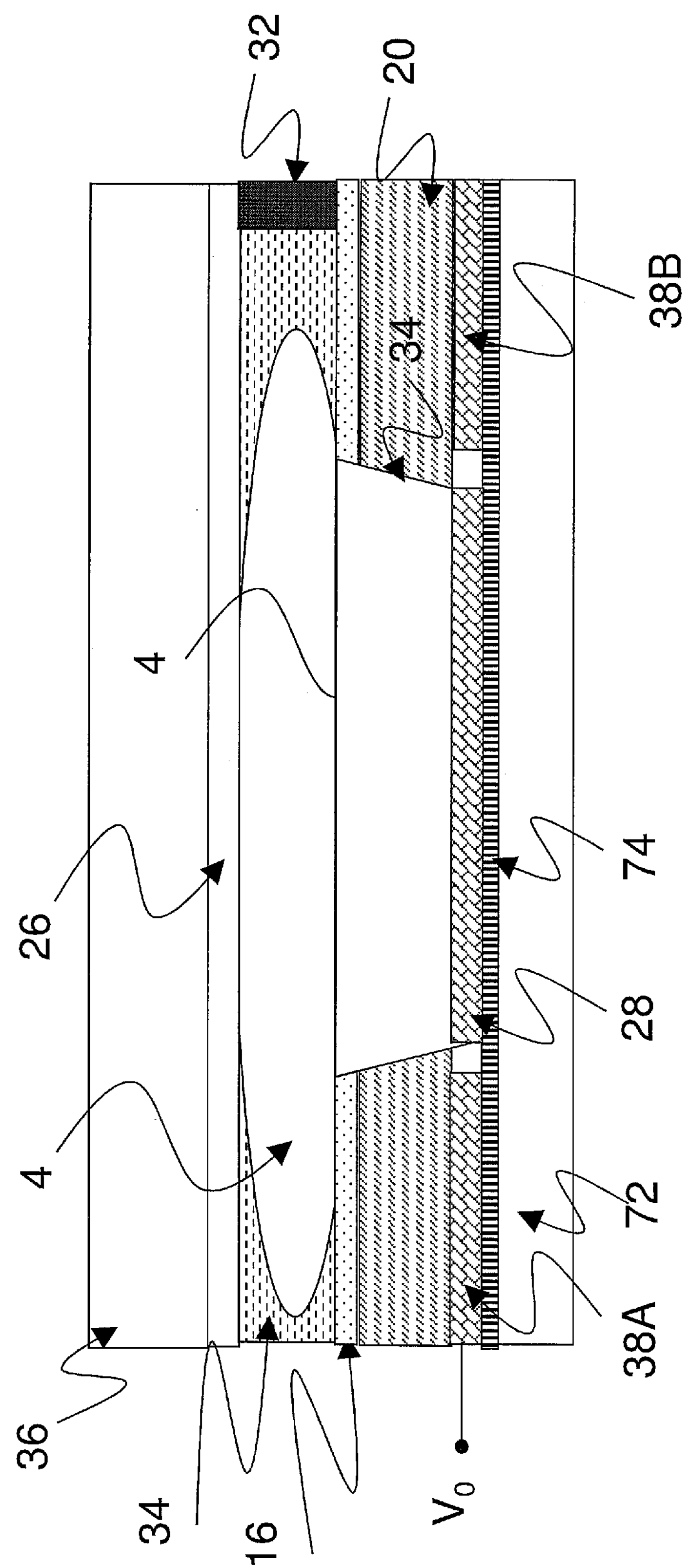
Figure 14: Sixth embodiment

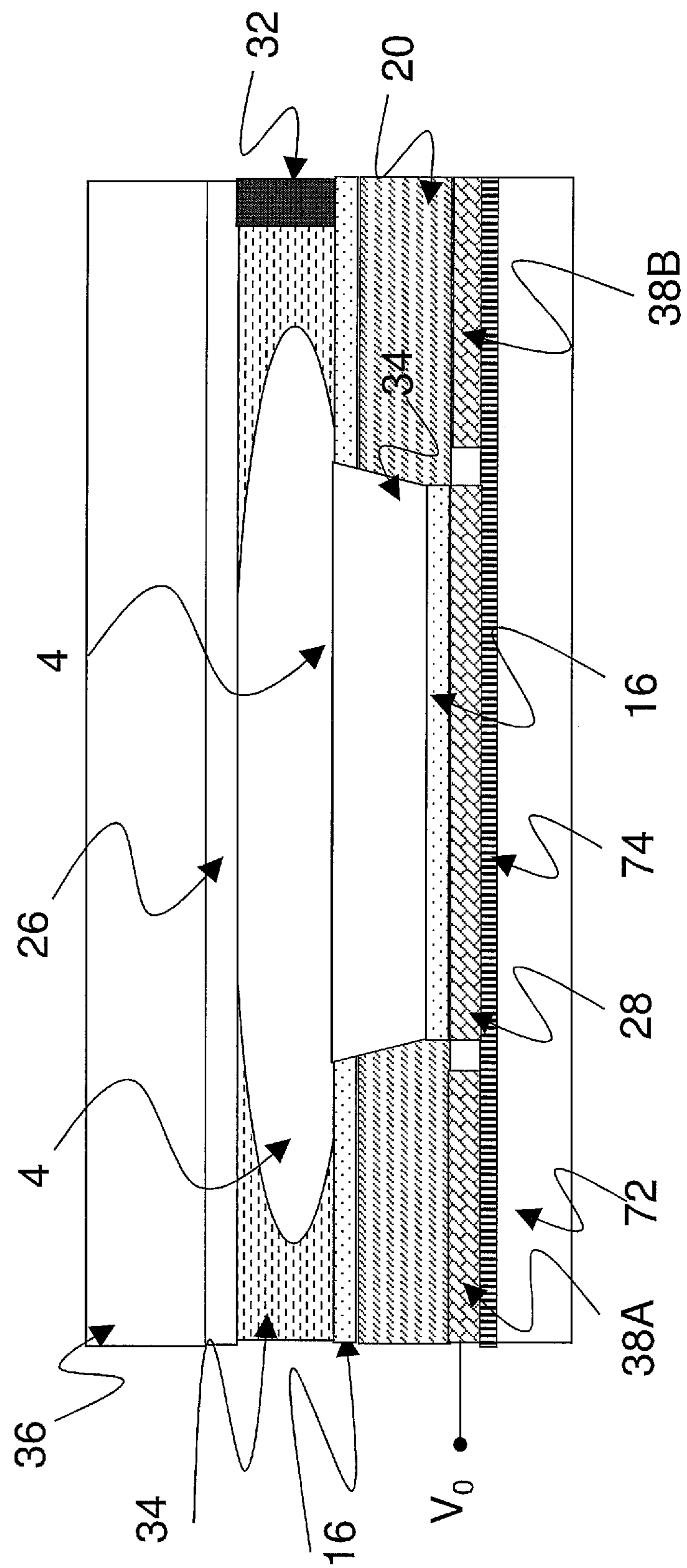
*Figure 15: Sixth embodiment*

Figure 16: Seventh embodiment
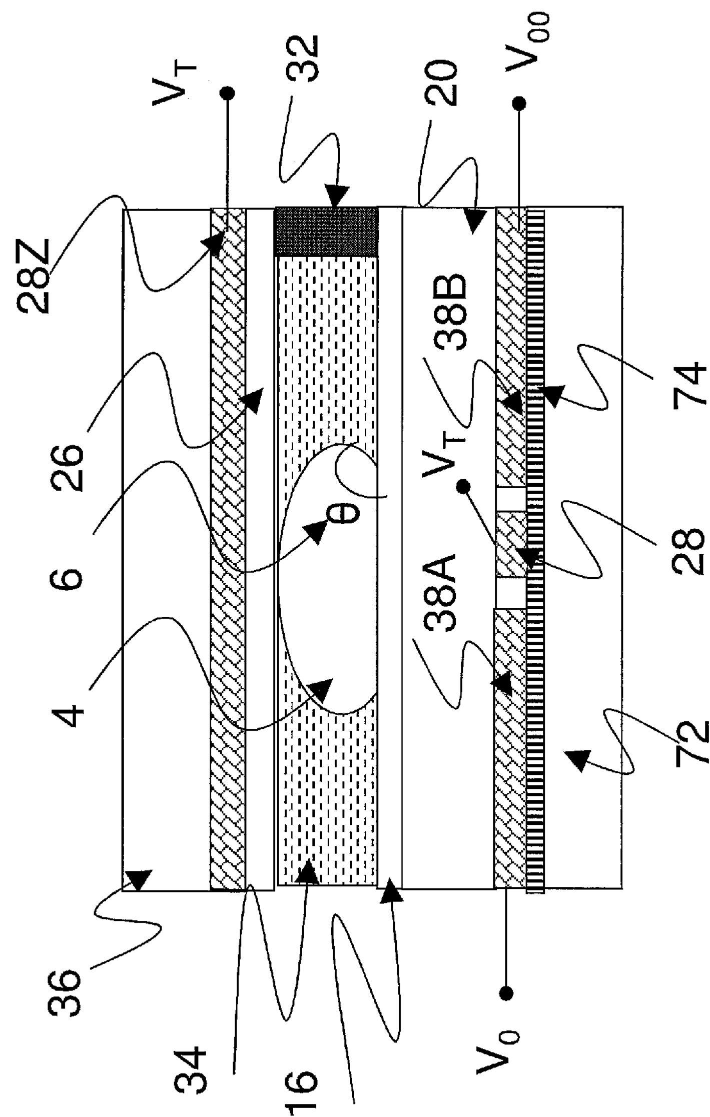

*Figure 17: Eighth embodiment*
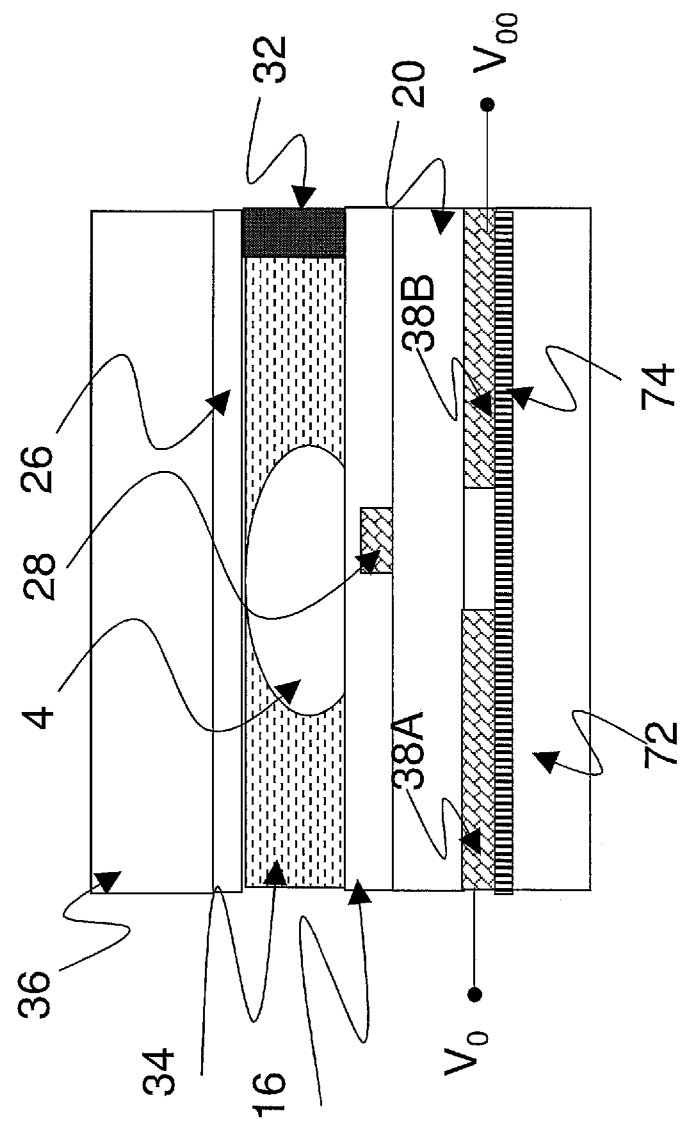

ACTIVE MATRIX EWOD DEVICE AND METHOD OF DRIVING THEREOF

RELATED APPLICATIONS

This application is a national phase of International Patent Application Serial No. PCT/JP2016/000063, filed on Jan. 7, 2016 which claims priority to GB Application No. 1500262.9 filed on Jan. 8, 2015, the entire disclosures of which are hereby incorporated by reference.

TECHNICAL FIELD

The present invention relates to active matrix arrays and elements thereof. In a particular aspect, the present invention relates to digital microfluidics, and more specifically to Active Matrix Electro-wetting-On-Dielectric (AM-EWOD). Electro-wetting-On-Dielectric (EWOD) is a known technique for manipulating droplets of fluid on an array. Active Matrix EWOD (AM-EWOD) refers to implementation of EWOD in an active matrix array incorporating transistors, for example by using thin film transistors (TFTs). The invention further relates to methods of driving such a device.

BACKGROUND ART

Electro-wetting on dielectric (EWOD) is a well known technique for manipulating droplets of fluid by application of an electric field. It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 shows a part of a conventional EWOD device in cross section. The device includes a lower substrate 72, the uppermost layer of which is formed from a conductive material which is patterned so that a plurality of electrodes 38 (e.g., 38A and 38B in FIG. 1) are realized. The electrode of a given array element may be termed the element electrode 38. The liquid droplet 4, consisting of a polar material (which is commonly also aqueous and/or ionic), and is constrained in a plane between the lower substrate 72 and a top substrate 36. A suitable gap between the two substrates may be realized by means of a spacer 32, and a non-polar fluid 34 (e.g. oil) may be used to occupy the volume not occupied by the liquid droplet 4. An insulator layer 20 disposed upon the lower substrate 72 separates the conductive element electrodes 38A, 38B from a first hydrophobic coating 16 upon which the liquid droplet 4 sits with a contact angle 6 represented by θ. The hydrophobic coating is formed from a hydrophobic material (commonly, but not necessarily, a fluoropolymer).

On the top substrate 36 is a second hydrophobic coating 26 with which the liquid droplet 4 may come into contact. Interposed between the top substrate 36 and the second hydrophobic coating 26 is a reference electrode 28.

The contact angle θ 6 is defined as shown in FIG. 1, and is determined by the balancing of the surface tension components between the solid-liquid ($\gamma_{SL}$), liquid-gas ($\gamma_{LG}$) and non-ionic fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \quad \text{(equation 1)}$$

In certain cases, the relative surface tensions of the materials involved (i.e. the values of $\gamma_{SL}$, $\gamma_{LG}$ and $\gamma_{SG}$) may be such that the right hand side of equation (1) is less than −1. This may commonly occur in the case in which the non-polar fluid 34 is oil. Under these conditions, the liquid droplet 4 may lose contact with the hydrophobic coatings 16 and 26, and a thin layer of the non-polar fluid 34 (oil) may be formed between the liquid droplet 4 and the hydrophobic coatings 16 and 26.

In operation, voltages termed the EW drive voltages, (e.g. $V_T$, $V_0$ and $V_{00}$ in FIG. 1) may be externally applied to different electrodes (e.g. element electrodes 38, 38A and 38B, respectively). The resulting electrical forces that are set up effectively control the hydrophobicity of the hydrophobic coating 16. By arranging for different EW drive voltages (e.g. $V_0$ and $V_{00}$) to be applied to different element electrodes (e.g. 38A and 38B), the liquid droplet 4 may be moved in the lateral plane between the two substrates 72 and 36.

In the following description, it will be assumed that an element of an EWOD device, such as the device of FIG. 1, may receive "digital" data so that the element is required to be put in either an "actuated" state (in which the voltage applied across the element is sufficient for a liquid droplet in the element (if one is present in the element) to experience a significant electro-wetting force) or a "non-actuated" state (in which the voltage applied across the element is not sufficient for a liquid droplet in the element (if one is present in the element) to experience a significant electro-wetting force). An element of an EWOD device may be put into the actuated state by applying a voltage difference across the EWOD element having a magnitude that is equal to, or greater than, a threshold voltage $V_{EW}$, whereas if the voltage difference across the EWOD element has a magnitude that is less, or much less than the threshold voltage $V_{EW}$ the element is in its non-actuated state. The threshold voltage $V_{EW}$ is often referred to as an "actuation voltage", and this term is used below. In practice the threshold voltage may typically be determined as the minimum voltage required to effect droplet operations, for example the moving or splitting of droplets. In many cases there is one threshold voltage for droplets to move and a second (higher) threshold voltage for droplets to split, and in such cases the "actuation voltage" is preferably set above the threshold required for droplets to split. In practice the non-actuated state may typically be zero volts.

Typically EWOD systems may be considered to be digital, in that the EWOD elements are programmed either to an actuated state or a non-actuated state. However, the actuation due to electro-wetting is essentially analogue in nature, so the actuation force can be tuned by varying the voltage (up to a certain maximum voltage at which the actuation force saturates). Some performance parameters also depend in an analogue manner on voltage—for example the maximum speed of movement of a droplet is approximately proportional to the applied voltage. It should therefore be understood that an EWOD device may alternatively be operated by supplying analogue input data rather than digital data.

FIG. 2 shows a circuit representation of the electrical load presented between the element electrode 38 and the reference electrode 28. The liquid droplet 4 can be modelled as resistor and capacitor in parallel, the hydrophobic coatings 16 and 26 as capacitors and the insulator 16 as a capacitor. For the purposes of driving and sensing the electrical load functions effectively as a capacitor whose value depends on whether a liquid droplet 4 is present or not a given element electrode 38.

U.S. Pat. No. 6,565,727 (Shenderov, issued May 20, 2003) discloses a passive matrix EWOD device for moving droplets through an array.

U.S. Pat. No. 6,911,132 (Pamula et al., issued Jun. 28, 2005) discloses a two dimensional EWOD array to control the position and movement of droplets in two dimensions.

U.S. Pat. No. 6,565,727 further discloses methods for other droplet operations including the splitting and merging of droplets, and the mixing together of droplets of different materials.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in AM display technologies.

The approach of U.S. Pat. No. 7,163,612 may be termed "Active Matrix Electro-wetting on Dielectric" (AM-EWOD). There are several advantages in using TFT based thin film electronics to control an EWOD array, namely:

- Electronic driver circuits can be integrated onto the lower substrate 72
- TFT-based thin film electronics are well suited to the AM-EWOD application. They are cheap to produce so that relatively large substrate areas can be produced at relatively low cost
- TFTs fabricated in standard processes can be designed to operate at much higher voltages than transistors fabricated in standard CMOS processes. This is significant since many EWOD technologies require EWOD actuation voltages in excess of 20V to be applied.

EP2404675 (Hadwen et al., published Jan. 11, 2012) describes array element circuits for an AM-EWOD device. Various methods are known for programming and applying an EWOD actuation voltage to the EWOD element electrode 38. The voltage write function described includes a memory element of standard means, for example, based on Dynamic RAM (DRAM) or Static RAM (SRAM) and input lines for programming the array element.

Whilst EWOD (and AM-EWOD) devices can be operated with either DC or AC actuation voltages, in practice there are many reasons for preferring an AC method of driving, as reviewed in the previously cited reference R. B. Fair, Microfluid Nanofluid (2007) 3:245-281. It may be noted that droplets can be actuated and manipulated for a wide range of AC driving frequencies ranging typically from a few hertz to several kHz.

One possible method for implementing an AC driving method in an AM-EWOD device is to apply a ground potential to the reference electrode 28. To program a given element electrode in the array to a non-actuated state, the element electrode is programmed to a ground potential. To program a given array element electrode 38 to an actuated state, the element electrode potential 38 is programmed to alternate between a potential of $V_{EW}$ and $-V_{EW}$. However this method of driving has the significant disadvantage that the maximum voltage that must be switched by the transistors in the circuit in order to drive the element electrode 38 is required to be $2V_{EW}$.

U.S. Pat. No. 8,173,000 (Hadwen et al., issued May 8, 2012) describes an AM-EWOD device with array element circuit and method for writing an AC actuation voltage to the electrode. The AC drive scheme described by this patent utilizes the application of AC signals to both the element electrode 38 and to the reference electrode 28 of the device. Therefore, the device is capable of generating a voltage difference between the electrodes that varies between $+V_{EW}$ and $-V_{EW}$, whilst the transistors in the array element circuit are only ever required to operate with a rail-to-rail voltage of $V_{EW}$.

U.S. Pat. No. 8,653,832 describes how an impedance (capacitance) sensing function can be incorporated into the array element. The impedance sensor may be used for determining the presence and size of liquid droplets present at each electrode in the array.

U.S. Pat. No. 8,221,605 describes a coplanar electrode arrangement wherein the reference electrode is omitted from the top substrate and is replaced by an in-plane reference electrode which is disposed upon the lower substrate along with the drive electrodes. U.S. Pat. No. 8,221,605 discloses how the reference electrode may be comprise a two dimensional grid of conducting lines electrically and physically distinct from the drive electrodes.

U.S. Pat. No. 8,419,273 describes an AM-EWOD device with a temperature sensor integrated into each array element.

Ui-Chong Yi et al. report, in "Characterization of electrowetting actuation on addressable single-side coplanar electrodes", Journal of Micromechanics and Microengineering, Vol 16, p 2053-2059 (2006), electrowetting-on-dielectric actuations on coplanar electrodes with an electrode-free cover plate or no cover plate. By arranging driving and reference electrodes on one plate, such a configuration can accommodate more sensing mechanisms from above and thus allows increased flexibility for system development. Various coplanar electrodes are tested for contact angle changes with a focus on the effect of the percentage gap between electrodes.

US 2013/0271153 describes an AM-EWOD device in which each array element circuit includes a top substrate electrode and a drive electrode between which the one or more droplets may be positioned, with an insulator layer being interposed between the droplet(s) and the drive electrode, and write circuitry. At least some of the array element circuits include measure circuitry configured to detect a pinhole defect in the insulator layer.

WO 2008/101194 describes a method of determining the presence, partial presence or absence of a droplet at an electrode on a droplet actuator by: (a) providing a droplet actuator comprising: (i) a substrate comprising electrodes arranged on the substrate for conducting droplet operations on a surface of the substrate; and (ii) a capacitance detection circuit for detecting capacitance at the droplet operations surface at one or more of the electrodes; (b) detecting capacitance at the droplet operations surface at one or more of the electrodes; and (c) determining from the capacitance the presence, partial presence or absence of a droplet at the droplet operations surface at the electrode.

CITATION LIST

Patent Literature

PTL 1: U.S. Pat. No. 6,565,727
PTL 2: U.S. Pat. No. 6,911,132
PTL 3: U.S. Pat. No. 7,163,612
PTL 4: EP2404675
PTL 5: U.S. Pat. No. 8,173,000
PTL 6: U.S. Pat. No. 8,653,832
PTL 7: U.S. Pat. No. 8,221,605
PTL 8: U.S. Pat. No. 8,419,273
PTL 9: US 2013/0271153
PTL 10: WO 2008/101194

Non Patent Literature

NPL 1: R. B. Fair, Microfluid Nanofluid (2007) 3:245-281
NPL 2: Ui-Chong Yi et al. report, in "Characterization of electrowetting actuation on addressable single-side coplanar electrodes", Journal of Micromechanics and Microengineering, Vol 16, p 2053-2059 (2006)

SUMMARY OF INVENTION

Technical Problem

The actuation of the liquid droplets is not enabled with arrangements that minimize the voltage that is required to be switched by the active matrix array element circuit above. And the performance of the sensor is insufficient.

Solution to Problem

A first aspect of the invention provides an AM-EWOD device comprising:

a plurality of array element electrodes disposed on a first substrate and defining respective array elements in the AM-EWOD device;

a reference electrode disposed on the first substrate;

a sensor;

an array element electrode drive circuit; and a reference electrode drive circuit;

wherein the reference electrode drive circuit is configured to drive the reference electrode with any one of a first voltage waveform for actuating an array element and a second voltage waveform different from the first voltage waveform when performing a sensing operation.

Since the array element electrodes and the reference electrode are disposed on the first substrate, they are all on the same side of a layer of the EWOD device within which liquid droplets move/are moved. This electrode configuration is sometimes known as an "in-plane" electrode configuration. It should however be noted that specifying that the first and second array elements are disposed "on" the first substrate does not require that they are disposed directly on the first substrate, and there may be one or more intervening layers between any one of the array element electrodes and the first substrate and/or between the reference electrode and the first substrate.

By specifying that the AM-EWOD device comprises a "sensor" is meant that the device may comprise a transducer configured to sense some physical property in the locality of the droplet, and optionally may also comprise a sensor circuit. In general, a sensor comprises a transducer for sensing a physical property and circuitry for addressing the transducer and obtaining an output signal indicative of the sensed value of the physical property. In many cases the circuitry for addressing the transducer may be contained in an array element, but in principle it is possible that the circuitry for addressing the transducer could be provided elsewhere, e.g. wires to the addressing lines.

The physical property sensed by the transducer may for example be the presence, size or absence of a liquid droplet (for example as determined from capacitance measurements), or may be some environmental property, e.g. temperature. The transducer may be the element electrode itself (for example the element electrode may act as a transducer for sensing capacitance), or else may be an electronic sensing structure, for example a transistor or a diode.

A second aspect of the invention provides a method of driving an AM-EWOD device, the device comprising a plurality of array element electrodes disposed on a substrate and defining respective array elements, a reference electrode disposed on the first substrate, and a sensor;

the method comprising driving the reference electrode with any one of a first voltage waveform for actuating an array element and a second voltage waveform different from the first voltage waveform when performing a sensing operation.

The invention provides an AM-EWOD device having both an actuation circuit 46 and a sensor within the electronic circuitry of the array element 84, for performing the respective functions of actuating a liquid droplet 4 and of sensing some physical property (e.g. capacitance present at, or temperature of) of the array element 84. As noted, the sensor may comprise a transducer for sensing a physical property in the locality of the droplet, and may optionally further comprise circuitry for addressing the transducer, such as the sensor circuit 48 provided in the embodiment of FIG. 6. The sensor circuit may be configured so as to sense the transducer. This may take the form of applying an electrical signal (for example a voltage) to the transducer and measuring some returned electrical property (for example a current). Optionally the array element may contain only a transducer and the electrical signals supplied to the transducer may be externally supplied, e.g. from the row driver circuit and/or column driver circuit. In the description of the preferred embodiments that follows the term "sensor" may, depending on the context, be taken to mean either the transducer or the combination of the transducer and the sensor circuit.

The AM-EWOD device has an in-plane reference electrode 28 which is disposed upon the lower substrate 72 along with the element electrodes 38. Electronic circuitry is arranged to apply a voltage signal to the in-plane reference electrode 28 that may consist of any one of:

A first driving signal, as appropriate for actuating one or more liquid droplets 4

A second driving signal, as appropriate for optimizing the operation of the sensor.

The first driving signal may typically be an AC voltage that supports actuation of the liquid droplets 4 with a minimal voltage being required to be switched by the transistors in the active matrix device. Examples are given in the described embodiments of the invention.

The second driving signal may typically be configured so as to utilize the in-plane reference electrode 28 as an electromagnetic shield to minimize the electrical cross-talk between adjacent sensors in the array. The second driving signal may for example be a ground supply or DC voltage supply such that the in-plane reference electrode 28 functions as an electromagnetic shield between neighboring array elements during the operation of the sensor.

Advantageous Effects of Invention

Among the advantages of the invention are one or more of the following:

The actuation of the liquid droplets 4 is enabled with arrangements that minimize the voltage that is required to be switched by the active matrix array element circuit The performance of the sensor is improved by using the reference electrode as an electromagnetic shield during the sense operation. This reduces cross-talk between neighboring array elements There is no requirement to have the reference electrode 28 on the top substrate 72. This may simplify the manufacturing process to fabricate the device.

Co-pending UK patent application No. 1500260.3 describes an alternative method of implementing an AC drive scheme which also utilizes an AC waveform applied to the reference electrode.

Co-pending UK patent application No. 1500261.1 also describes a method of implementing an AC drive scheme which also utilizes an AC waveform applied to the reference electrode.

BRIEF DESCRIPTION OF DRAWINGS

FIG. 3 is a schematic diagram depicting a an AM-EWOD device in schematic perspective in accordance with a first and exemplary embodiment of the invention.

FIG. 4 shows a cross section through some of the array elements of the exemplary AM-EWOD device of FIG. 3.

FIG. 5 is a schematic diagram depicting the arrangement of thin film electronics in the exemplary AM-EWOD device of FIG. 3 according to a first embodiment of the invention.

FIG. 6 is a schematic diagram depicting the array element circuit for use in the array elements of the exemplary AM-EWOD device of FIG. 3 according to a first embodiment of the invention.

FIG. 7 shows an exemplary arrangement of element electrodes and in-plane reference electrode in accordance with a first embodiment of the invention.

FIG. 8 shows an exemplary circuit arrangement of a reference electrode driver circuit according to a first embodiment of the invention.

FIG. 9 is a pictorial representation explaining the advantages of the invention.

FIG. 10 shows an exemplary arrangement of element electrodes and in-plane reference electrode in accordance with a second embodiment of the invention.

FIG. 11 shows an exemplary arrangement of element electrodes and in-plane reference electrode in accordance with a third embodiment of the invention.

FIG. 12 shows an exemplary arrangement of element electrodes and in-plane reference electrode in accordance with a fourth embodiment of the invention.

FIG. 13 shows an exemplary arrangement of element electrodes and in-plane reference electrode in accordance with a fifth embodiment of the invention.

FIG. 14 shows a cross section through some of the array elements of the exemplary AM-EWOD device of FIG. 3 according to a sixth embodiment of the invention.

FIG. 15 shows a cross section through some of the array elements of the exemplary AM-EWOD device of FIG. 3 according to a variant of the sixth embodiment of the invention.

FIG. 16 shows a cross section through some of the array elements of the exemplary AM-EWOD device of FIG. 3 according to a seventh embodiment of the invention.

FIG. 17 shows a cross section through some of the array elements of the exemplary AM-EWOD device of FIG. 3 according to an eighth embodiment of the invention.

DESCRIPTION OF EMBODIMENTS

Figure 1:
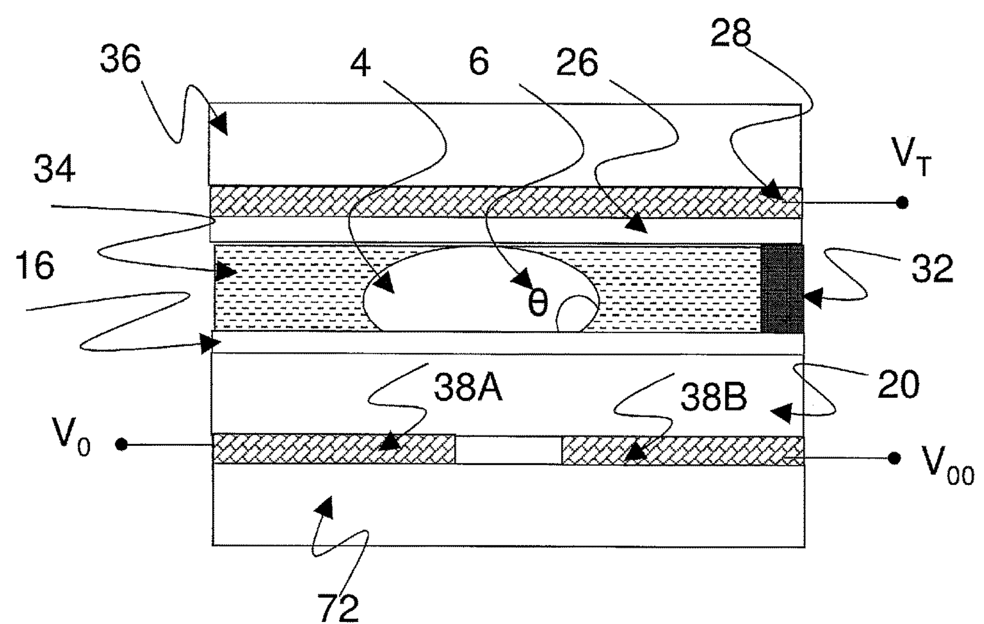
FIG. 1 is a schematic diagram depicting a conventional EWOD device in cross-section.

In the annexed drawings, like references indicate like parts or features.

FIG. 3 is a schematic diagram depicting an AM-EWOD device in accordance with an exemplary embodiment of the present invention. The AM-EWOD device has a lower substrate 72 with thin film electronics 74 disposed upon the lower substrate 72. The thin film electronics 74 are arranged to drive the array element electrodes 38. A plurality of array element electrodes 38 are arranged in an electrode array 42, having X by Y elements where X and Y may be any integer. Each array element electrode defines a respective array element in the device. A liquid droplet 4 which may consist of any polar liquid and which typically may be ionic and/or aqueous, is enclosed between the lower substrate 72 and a top substrate 36, although it will be appreciated that multiple liquid droplets 4 can be present. A suitable gap between the two substrates may be realized by means of a spacer 32, and a non-polar fluid 34, which could be oil, for example dodecane, silicone oil or other alkane oil, or alternatively air, may be used to occupy the volume not occupied by the liquid droplet 4.

FIG. 4 is a schematic diagram depicting a pair of the array elements 38A and 38B in cross section that may be utilized in the AM-EWOD device of FIG. 3. The device configurations of FIGS. 3 and 4 bear similarities to the conventional configuration shown in FIG. 1, with the AM-EWOD device of FIGS. 3 and 4 further incorporating the thin-film electronics 74 disposed on the lower substrate 72. The uppermost layer of the lower substrate 72 (which may be considered a part of the thin film electronics layer 74) is patterned so that a plurality of the array element electrodes 38 (e.g., 38A and 38B in FIG. 4) are realized. These may be termed the array element electrodes 38. The term array element electrode may be taken in what follows to refer both to the electrode 38 associated with a particular array element, and also to the node of an electrical circuit directly connected to this element electrode 38. The reference electrode 28 is also disposed upon the lower substrate 72 to realize an in-plane reference electrode geometry.

FIG. 5 is a schematic diagram depicting an exemplary arrangement of thin film electronics 74 upon the lower substrate 72. Each element of the electrode array 42 contains an array element circuit 84 for controlling the electrode potential of a corresponding element electrode 38. Integrated row driver 76 and column driver 78 circuits are also implemented in thin film electronics 74 to supply control signals to the array element circuits 84. A reference electrode drive circuit 50, for supplying a voltage signal to the reference electrode may be incorporated into the TFT electronics. Alternatively this may be supplied from external drive electronics.

A serial interface 80 may also be provided to process a serial input data stream and write the required voltages to the electrode array 42. A voltage supply interface 83 provides the corresponding supply voltages, top substrate drive voltages, and other requisite voltage inputs as further described herein. The number of connecting wires 82 between the lower substrate 72 and external drive electronics, power supplies etc. can be made relatively few, even for large array sizes. Optionally the serial data input may be partially parallelized, for example if 2 data input lines are used the first may supply data for columns 1 to X/2 and the second for columns (1+X/2) to X with minor modifications to the column driver 78 circuits. In this way the rate at which data can be written to the array is increased, a standard technique used in Liquid Crystal Display driving circuitry.

Generally, an exemplary AM-EWOD device that includes thin film electronics 74 is configured as follows. The AM-EWOD device includes a reference electrode 28 (e.g., an in-plane reference electrode 28) and a plurality of array elements, each array element including an array element electrode (e.g., array element electrodes 38).

Relatedly, the AM-EWOD device is configured to perform a method of controlling an actuation voltage to be applied to a plurality of array elements. The AM-EWOD device includes an AM-EWOD reference electrode 28 and a plurality of array elements, each array element including an array element electrode 38. The actuation voltage at each array element is defined by a potential difference between the array element electrode 38 and the reference electrode 28. The method of controlling the actuation voltage includes the steps of writing a voltage to at least a portion of the array element electrodes, and supplying voltage signal to the reference electrode 28.

FIG. 6 is a schematic diagram showing an example arrangement of thin film electronics 74 in the array element circuit 84. The array element circuit 84 contains an actuator circuit 46 which may typically perform the functions of (i) Writing data to a memory element contained within the actuator circuit and storing the data. The data to be written is typically input by means of an addressing line DATA which may be common to all elements within the same column of the array. The writing of data may typically be controlled by an addressing line ENABLE, which may typically be common to all elements within the same row of the array (ii) Writing a voltage signal to the array element electrode 38.

Examples of actuator circuits 46 may be found in U.S. Pat. No. 8,173,000 and co-pending UK patent applications Nos. 1500260.3 and 1500261.1 which may be considered as being incorporated by reference.

The array element circuit of FIG. 6 also contains a sensor circuit 48, which may be coupled by some means to the array element electrode 38. The sensor circuit 48 may be configured to sense some physical property of the array element electrode 38 or of a liquid droplet 4 in proximity to it, so that the combination of the sensor circuit 48 and the array element electrode forms a sensor. Alternatively the sensor circuit 48 may address another transducer (not shown). Examples of quantities that may be sensed by the sensor circuit 48 include electrical impedance (e.g. capacitance) or temperature. The sensor circuit 48 may typically be addressed by one or more addressing signals, e.g. RW, which may be common to each element in the same row of the array and which are generated by sensor row addressing circuitry 88, realized in the thin film electronics and as shown in FIG. 5. The sensor circuit 48 will typically have at least one output OUT, which may for example be common to each array element in the same column of the array. The readout of an output signal generated by the sensor circuit at OUT maybe performed, for example by a column detection circuit 86 which may also be realized in thin film electronics 74. Examples of sensor circuits may be found in U.S. Pat. No. 8,653,832 (impedance sensor) and in U.S. Pat. No. 8,419,273 (temperature sensor) which can be considered to be incorporated by reference.

Figure 2:
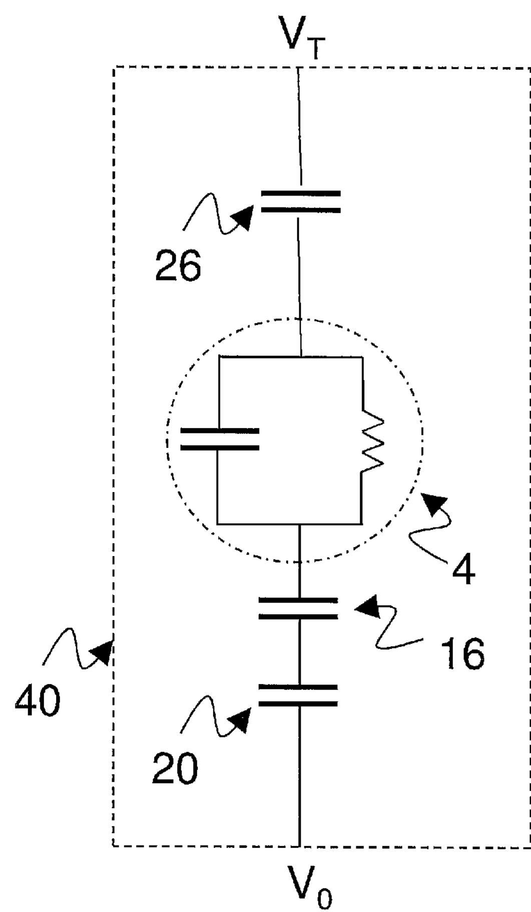
FIG. 2 is a circuit representation of the load presented at the array element when a droplet is present.

The remainder of the AM-EWOD device is of the standard construction previously described with respect to FIGS. 2-4 and may include a top substrate 36, a spacer 32 and a non-polar fluid 34 (e.g. an oil) as a surrounding medium within which the liquid droplets 4 are contained.

FIG. 7 shows an exemplary arrangement of the array element electrodes (38A, 38B, . . . 38I) and the reference electrode 28 on the lower substrate 72 in plan view. The array element electrodes (38A, 38B, . . . 38I) and reference electrode 28 are arranged in a substantially coplanar geometry and may typically be realized by the same physical layer in the manufacturing process. This may for example be the Indium Tin Oxide (ITO) layer if a displays manufacturing layer is used to fabricate the AM-EWOD device.

At least a part of the reference electrode is disposed between a first array element electrode of the plurality of array element electrodes and a second array element electrode of the plurality of array element electrodes. For example, the in-plane reference electrode 28 may be arranged in a "cross hatch" or "grid" pattern as shown in FIG. 7, such that a thin strip of reference electrode is disposed in the spacing between each element electrode 38 in the array. Typically, but not necessarily, the width of each strip of reference electrode 28 and the spacing between the edge of the reference electrode 28 and the edge of the neighboring array element electrode 38 may be of the minimum values allowed by the design rules of the fabrication process. This is to minimize the spacing between the edges of neighboring array element electrodes. A voltage signal is supplied to the reference electrode 28 from a reference electrode driver circuit 50. The reference electrode driver circuit 50 is configured to supply a different voltage signal to the reference electrode 28 according to whether the liquid droplet 4 is being actuated or whether the array element is being sensed. An example arrangement of the reference electrode driver circuit 50 is shown in FIG. 8, organized so that a different electrical signal is supplied to the reference electrode 28 according to whether the array is operating as a sensor or as an actuator. The reference electrode driver circuit 50 may be provided in electronics external to the AM-EWOD or alternatively and optionally realized in thin film electronics 74 disposed upon the lower substrate 72.

At times when the array is operating so as to actuate liquid droplets 4, a logic control signal ACTUATION ENABLE is taken to logic level high to close switch S2, whilst logic control signal SENSOR ENABLE is at logic level low so that switch S1 is open. The output OUT of the reference electrode driver circuit 50 is then connected to an AC voltage signal V2.

At times when the array is operating as a sensor, logic control signal SENSOR ENABLE is taken to logic level high to close switch S1, whilst ACTUATION ENABLE is at logic level low so that switch S2 is open. The output OUT of the reference electrode driver circuit 50 is then connected to a DC voltage VDC. Having both ACTUATION ENABLE and SENSOR ENABLE simultaneously at logic level high is a forbidden condition.

The voltage signal V2, applied to the reference electrode 28 for the purposes of droplet actuation is typically an AC voltage waveform that is selected to be of a favorable configuration (e.g. amplitude, frequency) for actuating the liquid droplets 4. In particular, and advantageously, the application of an AC voltage waveform may facilitate droplet actuation with a lower voltage being required to be switched by the thin film transistors comprising the array element actuation circuit 46 than would be the case if the reference electrode 28 was connected to a DC supply voltage during actuation. In particular, an advantageous arrangement for actuation of the liquid droplets 4 is to supply a first AC voltage signal, e.g. a square wave, to the element electrode 38 and to supply a second AC voltage signal to the reference electrode 28 where the second voltage signal is in anti-phase to the first voltage signal. In the case where the liquid droplet 4 is not being actuated, the second AC voltage signal may be supplied both to the element electrode 38 in the location of the liquid droplet 4 and to the reference electrode 28. This method is described in detail in U.S. Pat. No. 8,173,000, incorporated herein by reference.

The timing sequence applied to the AC voltage signal may be chosen as appropriate to the details of the actuation circuit 46 and method of driving being used, examples are given in U.S. Pat. No. 8,173,000 and in co-pending UK patent application No. 1500260.3.

When the array is operating as a sensor, the voltage waveform applied to the reference electrode 28 may be configured to cause the reference electrode to provide electromagnetic shielding between an array element electrode and a neighbouring array element electrode. The voltage signal VDC applied to the reference electrode 28 for the purposes of performing a sense operation is advantageously a DC voltage signal for the purposes of maximizing the performance of the sensor. In particular the cross hatch geometry of the in-plane reference electrode of FIG. 7 has the effect of providing electromagnetic shielding between neighboring elements within the array. This benefit is realized because a part of reference electrode 28 runs through the gap between neighboring element electrodes 38 in the array. As a result of the electromagnetic shielding, parasitic electrical interactions, whereby the signal measured by a given array element is influenced to some extent by the neighboring array elements, may be substantially reduced.

An advantage of the in-plane reference electrode geometry is that it is no longer necessary to include a reference electrode on the top substrate 36. This may simplify the manufacturing process required to fabricate the top substrate 36 and thus reduce the manufacturing cost of the AM-EWOD device.

The main advantage of the invention is that the in-plane reference electrode geometry markedly improves sensor performance, by minimizing parasitic interactions between neighboring array elements.

This advantage is illustrated pictorially in FIG. 9 for the example whereby the sensor is measuring capacitance. A capacitance sensing function may be used to determine the presence or absence of a liquid droplet 4 at a given array element electrode 38 and also the size of a liquid droplet/degree of coverage of the electrode.

FIG. 9A illustrates the situation for a standard (prior art) device architecture, as described in prior art and shown in FIG. 1, where the reference electrode 28 is disposed upon the top substrate 36. In this case there is no in-plane reference electrode. In this case, a significant parasitic capacitance exists between the liquid droplet 4 and the array element electrode 38B adjacent to the array element electrode where the droplet resides. Ideally the sensor signal measured at element electrode 38B would be the same as that measured at an array element a long way away from any liquid droplet 4. However in practice a larger signal is measured for the capacitance presented at 38B because of the parasitic capacitance 90 between element electrode 38B and the liquid droplet 4. The lower part of the FIG. 9A shows a graphical representation of the example sensor image that might be measured. Ideally only the central pixel of the image (corresponding to the array element 38A where the liquid droplet 4 resides) should return any signal. In practice neighboring array elements also return some signal because of the parasitic interaction between neighboring array elements, as illustrated in the example image.

FIG. 9B illustrates the situation for the arrangement described in this embodiment of the invention, and where the device cross-section is as shown in FIG. 4. The presence of the reference electrode 28, in the same plane as, and disposed between, array element electrodes 38A and 38B, substantially reduces the value of parasitic capacitor 90. The cross-coupling between neighboring array elements is thus significantly reduced. The lower part of FIG. 9B shows a pictorial representation of the sensor image in this case. Compared to FIG. 9A, the signal measured outside of the central pixel (corresponding to the array element where the liquid droplet 4 resides) is substantially reduced.

Reducing sensor cross-coupling in this way may be particularly advantageous in the case where capacitance sensing is used as a method of measuring the volume of the liquid droplet 4. An effect of cross-coupling is that the volume of the liquid droplet 4 can size the measured droplet bigger than it actually is. Although the effects of cross-coupling can be compensated to some extent by data processing techniques, it is preferable, and more accurate to try to reduce the source of the parasitic interactions, which is an advantage of the present invention.

The advantages of the first embodiment have been described in the case where the sensor circuit 48 of the array element circuit 84 is configured for sensing droplet capacitance. It will be appreciable how using the reference electrode 28 as an electromagnetic shield to reduce the parasitic interaction between neighboring array elements will have similar benefits for other types of sensor, e.g. impedance, optical, temperature.

A second embodiment of the invention is as the first embodiment, with an alternative arrangement of the in plane reference electrode as shown in plan view in FIG. 10. In this case the in-plane reference electrode 28 is arranged so that each cross-hatched square of reference electrode encloses a plurality of array element electrodes, in this example a 2×2 block of grouped array element electrodes 38. The operation of the AM-EWOD device is essentially the same as described for the first embodiment, although typically the electrode arrangement of the second embodiment is well suited to the manipulation of droplets having a diameter twice the array elements or bigger. In this case, the diameter of the droplet is typically sufficiently large to ensure that at any time at least a part of the droplet is in direct proximity to the reference electrode. The device then functions as previously described. An advantage of the second embodiment is that the individual array elements within each 2×2 block may be physically located closer together. This may increase the speed of a droplet transition from one 2×2 block to an adjacent 2×2 block, since the leading edge of the droplet only has to traverse a single strip of reference electrode 28 in order to move a distance of two array element electrodes. It will be apparent how the concept of the second embodiment may be easily extended to e.g. a 3×3 block of array elements and operation with droplets of a diameter of at least 3 times the array element size, etc., or to a 4×4 block etc. Similarly it will be appreciated how the size of the block of grouped array elements may be different in different parts of the array.

Although FIGS. 7, 9B and 10 show the reference electrode 28 having a cross-hatch or grid form, the invention is not limited to this. In general, the invention may be embodied such that the reference electrode is provided between at least a column of array element electrodes including the first array element electrode and a column of array element electrodes including the second array element electrode, or between at least a row of array element electrodes including the first array element electrode and a row of array element electrodes including the second array element electrode. For example, a third embodiment of the invention whereby an alternative arrangement of the in-plane reference electrode 28 is used as is shown in FIG. 11. In this embodiment the reference electrode 28 is partitioned into multiple independently-addressable electrode segments 28A, 28B, etc. that are not electrically connected to one another. The segments of reference electrode may run in the row direction as shown in the exemplary arrangement of FIG. 11, where segment 28A runs between rows N−1 and N of the array, and segment 28B runs between rows N and N+1. The individual segments of reference electrode, e.g. 28A are driven by a reference electrode driver circuit, e.g. 50A, so that different voltage signals may be supplied to different segments of the reference electrode 28. This arrangement may be used for example to supply different voltage signals to different individual segments of the reference electrode 28. This may be advantageous in a situation where different parts of the array are simultaneously driven to perform different functions. For example one or more rows of the array could be driven so as to actuate liquid droplets 4 present on those rows, whilst simultaneously one or more rows are driven so as to sense liquid droplets 4 present on those rows. The one or more reference electrode segments adjacent to those rows being used to sense may be driven by a DC voltage signal whilst the one or more reference electrode segments adjacent to those rows being used to actuate may be driven by an AC voltage signal, as described in previous embodiments. An advantage of the third embodiment of the invention is that it supports different rows of the array being used to perform different operations simultaneously. This may increase the speed at which liquid droplets 4 can be manipulated whilst also simultaneously sensing the liquid droplets 4.

A fourth embodiment of the invention is shown in FIG. 12. The arrangement of the in-plane reference electrode 28, is as per the third embodiment, with the reference electrode partitioned into independently-addressable electrode segments running in the row direction, e.g. 28A, 28B, the voltage signals applied to which are driven from the reference electrode driver circuits 50A and 50B. The sensor circuit 48 within each array element is operated on a row by row basis which may be controlled by row selection addressing lines RWS which may have a common connection to each array element in the same row of the array, e.g. RWS and RWSB. Example array element circuit arrangements incorporating a capacitance sensor circuit are described in U.S. Pat. No. 8,653,832 along with examples of suitable timings for addressing the sensor on a row by row basis. Typically the sensor may operate so as to sample the quantity being measured (e.g. capacitance) over a time period during which the RWS signal is taken high. Also typically, the RWS signal may act so as to perturb a property of the array element during the time for which it is taken high. For example, when performing capacitance sensing, the action of taking RWS high perturbs the potential of the array element electrode 38 in accordance with the capacitance (e.g. due to a liquid droplet 4 being in situ) presented at the array element electrode 38.

Commonly the sensor circuit 48 may also have other connections that are addressed by a row addressing line, e.g. a reset line, as also described in U.S. Pat. No. 8,653,832. According to this embodiment of the invention, when the AM-EWOD device is configured so as to operate the sensor function on one a given row of the array, the voltage signal applied to the reference electrode 28A may also be pulsed with common timings to the perturbation of RWSA. The timings and amplitude of the voltage pulse supplied to reference electrode segment 28A may be chosen to optimize the electromagnetic shielding effect that the reference electrode has, for example by arranging the timing and amplitude by which 28A is perturbed to be similar to the timing and amplitude by which the array element electrodes 38 within that row of the array are perturbed. An advantage of the fourth embodiment is that by driving the reference electrode segments in this way, the electromagnetic shielding effect of the reference electrode may be improved. This may result in a higher performance sensor with minimal cross-talk between neighboring array elements. This in turn will improve the ability of the AM-EWOD device to measure droplet characteristics accurately, e.g. droplet size. It will be apparent that a number of variants of the fourth embodiment are also possible, for example multiple segments of reference electrode 28 may be perturbed in accordance with the perturbation of a given RWS signal. For example, with reference to FIG. 12, when row N is sensed, RWSB is perturbed and it may be advantageous to also pulse reference electrode segments 28A and 28B in accordance with the timings applied to RWSB. This may reduce the electromagnetic cross-coupling interactions between row N and row N−1 and also between row N and row N+1. According to another variant of the fourth embodiment, the reference electrode may be arranged to run in the column direction instead of the row direction.

A fifth embodiment of the invention is as the third or fourth embodiments with an alternative geometry of in plane reference electrode as shown in FIG. 13. The reference electrode segments 28A, 2B, etc. run in the row direction as per the previous embodiment, but additional reference electrode extensions 99 in the column direction as shown in FIG. 13. The reference electrode extensions 99 may be arranged so that the spacing gap 101 between 28A and 28B is minimized to the minimum allowed by manufacturing design rules. The device operates as per the description of the third or fourth embodiments, with an additional advantage that the additional reference electrode extensions 99 of the reference electrode helping to ensure that the droplet always remains in immediate proximity to a part of a reference electrode, even when the droplet is pulled (e.g. by the electro-wetting force) into an elongated geometry, for example along the row direction.

The third, fourth and fifth embodiments have been described in the exemplary case where the individual segments of in-plane reference electrode 28 are arranged to run in the row direction of the array. Equally it will be appreciated that the individual segments of reference electrode could run in the column direction. Similarly an individual segment could be common to multiple rows or multiple columns or an individual segment could be common to a rectangular portion of the array.

A sixth embodiment of the invention is as any previous embodiment where additionally the hydrophobic coating 16 and insulator layer 20 are patterned so as to remove these layers in the vicinity of some or all of the in-plane reference electrode 28. An exemplary cross section of the device in this case is as shown in FIG. 14. In accordance with this embodiment of the invention, the liquid droplet 4 (where present) may come directly into contact with the in-plane reference electrode 28. This may have the effect of pinning the potential of the liquid droplet 4 directly to the potential of the reference electrode 28. One advantage of this embodiment is that the potential of the reference electrode 28 is better defined in this arrangement. This may have advantage effect of reducing the electro-wetting voltage required for actuation. A further advantage is that sensor performance may be improved, especially in the example where the sensor is configured to sense capacitance, since the droplet potential is better defined. For example sensor fixed pattern noise may be reduced and the maximum speed of the sensor may be increased since effects associated with the droplet having a finite charging/discharging time may be reduced.

In a variant of the sixth embodiment, optionally, the insulator layer 20 may be removed whilst the hydrophobic coating 16 is retained above the element electrode, shown FIG. 15. The operation according to this variant is essentially unchanged. This is because the hydrophobic coating 16 may be relatively porous to ions in the liquid droplet. Therefore even with the hydrophobic coating retained, the potential of the liquid droplet 4 may still be effectively pinned to the potential of the reference electrode 28. This variant is advantageous since it does not require the hydrophobic coating 16 to be patterned in the vicinity of the reference electrode and a continuous hydrophobic coating is preserved over the droplet handling area. Reducing the requirement to pattern the hydrophobic coating is advantageous for simplifying the manufacturing process and reducing cost. Maintaining a continuous hydrophobic coating in the droplet handling region is advantageous for fluid handling performance as hydrophilic regions caused by patterning this hydrophobic coating 16 may result in the liquid droplet 4 being pinned in these regions, impeding its movement.

A seventh embodiment of the invention is shown in FIG. 16. This is as any of the previous embodiments where the reference electrode is formed both as in-plane reference electrode 28 and additionally also on the top substrate reference electrode 28Z. The operation of the device is then as described for previous embodiments, where the top substrate reference electrode 28Z may be driven by driven by a voltage source that is common to the in-plane reference electrode. An advantage of the seventh embodiment is that the provision of both a top substrate reference electrode 28Z and an in-plane reference electrode 28 may further improve the electrical shielding between adjacent array elements and thus reduce sensor cross talk still further. Optionally in the seventh embodiment, the top substrate reference electrode 28Z may be driven by a different signal to that used to drive the in-plane reference electrode 28. For example the top substrate reference electrode 28Z may be driven by an AC signal to support droplet actuation, whilst the in-plane reference electrode 28 is driven by a DC voltage supply to reduce parasitic cross-coupling between sensor circuits in adjacent array elements. This arrangement may be advantageous, for example, in the situation where the device is being used to actuate and sense droplets simultaneously, for example by actuating one or more rows whilst simultaneously sensing one or more rows.

FIG. 17 shows a cross-section through the exemplary AM-EWOD device according to an eighth embodiment of the invention. This embodiment is as per previous embodiments except that the reference electrode 28 is disposed between the insulator layer 20 and the hydrophobic coating 16. (Although not illustrated, the features of the eighth embodiment may be applied to a device of the seventh embodiment having the top substrate reference electrode 28Z.) According to this embodiment the reference electrode 28 may be formed in a different processing step to the element electrodes 38, but is still disposed upon the bottom substrate and thus exists in a substantially coplanar geometry to the element electrodes 28. The operation of the device according to this embodiment is then as previously described. This embodiment has the advantage that the reference electrode 28 is electrically in close communication with the liquid droplet 4, since the insulator layer 20 does not now lie between the reference electrode 28 and the liquid droplet 4. Since the hydrophobic coating may be relatively porous to mobile ions in the liquid droplet 4, the liquid droplet 4 is electrically pinned to the potential of the reference electrode 28. The potential of the liquid droplet is thus better defined and so this embodiment has the same advantages as already described for the sixth embodiment. An additional advantage of the eighth embodiment is that it does not require the insulator layer 20 to be patterned. This may advantageously reduce processing complexity and cost, whilst retaining the other advantages of the sixth embodiment. As a variant of the eighth embodiment, the reference electrode may also be deposited on top of the hydrophobic coating 28, with similar advantages resulting.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

For example, at least a part of the reference electrode may be disposed between a first array element electrode of the plurality of array element electrodes and a second array element electrode of the plurality of array element electrodes. If so, the second voltage waveform may be configured to cause the reference electrode to provide electromagnetic shielding between the first array element electrode and the second array element electrode.

The second voltage waveform may be a dc voltage waveform.

The device may further comprise an array element electrode drive circuit configured to, when the reference electrode drive circuit is driving the reference electrode with the first voltage waveform, drive an array element electrode with a third voltage waveform for actuating the array element, the third voltage waveform being out of phase with the first voltage waveform.

The reference electrode may comprise a plurality of independently addressable electrode segments.

The reference electrode drive circuit may be configured to drive one electrode segment of the reference electrode with the first voltage waveform and simultaneously to drive another electrode segment of the reference electrode with the second voltage waveform.

The array element electrodes may be arranged in a matrix of rows and columns.

The reference electrode may be provided between at least a column of array element electrodes including the first array element electrode and a column of array element electrodes including the second array element electrode, or between at least a row of array element electrodes including the first array element electrode and a row of array element electrodes including the second array element electrode.

For example, the reference electrode may be in the form of a grid, and have a plurality of electrode segments extending in the column direction and a plurality of electrode segments extending in the row direction. Each "aperture" in the reference electrode may be made slightly larger in size than an array element electrode, so that array element electrodes are contained within respective "apertures" in the reference electrode as shown for example in FIG. 9B. Alternatively, each "aperture" in the reference electrode may be large enough to accommodate a plurality of array element electrodes; one such embodiment is shown in FIG. 10, in which four array element electrodes are accommodated in each "aperture" in the reference electrode.

As a further example, the reference electrode may comprise a plurality of electrode segments extending parallel to one another. Each electrode segment may for example be disposed between two adjacent rows, or between two adjacent columns, of array element electrodes. FIGS. 11 and 12 illustrate examples of this embodiment, in which a segment of the reference electrode runs between rows N−1 and N of the matrix of array element electrodes, another segment of the reference electrode runs between rows N and N+1 of the matrix of array element electrodes, and so on. The embodiment does not however require that every gap between adjacent rows of array element electrodes contains a segment of the reference electrode—as another example, a segment of the reference electrode runs between rows N−1 and N of the matrix of array element electrodes, the next segment of the reference electrode runs between rows N+1 and N+2 of the matrix of array element electrodes, and so on. Also, as noted, the segments of the reference electrode may extend between adjacent columns of array element electrodes.

As already noted, where the reference electrode comprises a plurality of electrode segments the electrode segments may be addressable independently from one another, or they may be electrically connected together so that every electrode segment is addressed together. As a further alternative, the electrode segments may be electrically connected together in groups, such that each group of electrode segments is addressable independently from any other group of electrode segments but such that every electrode segment in a group is addressed together.

In a further modification of this embodiment, the reference electrode may comprise a plurality of electrode segments that extend parallel to one another, with the electrode segments comprising extensions that extend in a direction crossed with the electrode segment, for example as shown in FIG. 13.

The device may further comprise a second reference electrode disposed on a second substrate opposed to the first substrate (so that a layer of the EWOD device within which liquid droplets move/are moved is between the first reference electrode and the second reference electrode).

The second reference electrode may be electrically connected to the reference electrode, and the reference electrode drive circuit may drive the second reference electrode in common with the reference electrode.

The second reference electrode may be addressable independently from the reference electrode.

The device may comprise an insulator layer disposed over the array element electrodes but not over the reference electrode.

The first and second array element electrodes and the reference electrode may be co-planar with one another The reference electrode may be disposed over the insulator layer.

The device may comprise a hydrophobic layer disposed over the array element electrodes but not over the reference electrode.

In a method according to the second aspect, the second voltage waveform may be configured to provide electromagnetic shielding between a first array element electrode of the plurality of array element electrodes and a second array element electrode of the plurality of array element electrodes.

The second voltage waveform may be a dc voltage waveform.

The method may further comprise, when driving the reference electrode with the first voltage waveform, driving an array element electrode with a third voltage waveform for actuating the array element, the third voltage waveform being out of phase with the first voltage waveform.

The reference electrode may comprises a plurality of independently addressable electrode segments, and the method may comprise driving one electrode segment of the reference electrode with the first voltage waveform and simultaneously driving another electrode segment of the reference electrode with the second voltage waveform.

For a fuller understanding of the nature and advantages of the invention, reference should be made to the ensuing detailed description taken in conjunction with the accompanying drawings.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The described embodiments could be used to provide an enhance AM-EWOD device. The AM-EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, tools for research in life sciences and forensic science.

REFERENCE SIGNS LIST

4 liquid droplet
6 contact angle θ
16 First hydrophobic coating
20 Insulator layer
26 Second hydrophobic coating
28 Reference electrode
32 Spacer
34 Non-polar fluid
36 Top substrate
38/38A and 38B Array Element Electrodes
42 Electrode array
46 Actuation circuit
48 Sensor circuit
50 Reference electrode driver circuit
72 Lower Substrate
74 Thin film electronics
76 Row driver circuit
78 Column driver circuit
80 Serial interface
82 Connecting wires
83 Voltage supply interface

84 Array element circuit
86 Column detection circuit
88 Sensor row addressing circuitry
90 Capacitor
99 Reference electrode extensions
101 Spacing gap

The invention claimed is:

1. An AM-EWOD device comprising:

a plurality of array element electrodes disposed on a first substrate and defining respective array elements in the AM-EWOD device;

a reference electrode disposed on the first substrate;

a sensor;

a reference electrode drive circuit; and a second reference electrode disposed on a second substrate opposed to the first substrate;

wherein the reference electrode drive circuit is configured to drive the reference electrode with any one of a first voltage waveform for actuating an array element and a second voltage waveform different from the first voltage waveform when performing a sensing operation using the sensor.

2. A device as claimed in claim 1 wherein at least a part of the reference electrode is disposed between a first array element electrode of the plurality of array element electrodes and a second array element electrode of the plurality of array element electrodes, and wherein the second voltage waveform is configured to cause the reference electrode to provide electro-magnetic shielding between the first array element electrode and the second array element electrode.

3. A device as claimed in claim 1 wherein the second voltage waveform is a DC voltage waveform.

4. A device as claimed in claim 1 and further comprising an array element electrode drive circuit configured to, when the reference electrode drive circuit is driving the reference electrode with the first voltage waveform, drive an array element electrode with a third voltage waveform for actuating the array element, the third voltage waveform being out of phase with the first voltage waveform.

5. A device as claimed in claim 1 wherein the reference electrode comprises a plurality of independently addressable electrode segments.

6. A device as claimed in any claim 5 wherein the reference electrode drive circuit is configured to drive one electrode segment of the reference electrode with the first voltage waveform and simultaneously to drive another electrode segment of the reference electrode with the second voltage waveform.

7. A device as claimed in claim 1 wherein the array element electrodes are arranged in a matrix of rows and columns, and wherein the reference electrode is provided between at least a column of array element electrodes including the first array element electrode and a column of array element electrodes including the second array element electrode, or is provided between at least a row of array element electrodes including the first array element electrode and a row of array element electrodes including the second array element electrode.

8. A device as claimed in claim 1 wherein the second reference electrode is electrically connected to the reference electrode, and wherein the reference electrode drive circuit drives the second reference electrode in common with the reference electrode.

9. A device as claimed in claim 1 wherein the second reference electrode is addressable independently from the reference electrode.

10. A device as claimed in claim 1 and comprising an insulator layer disposed over the array element electrodes but not over the reference electrode.

11. A device as claimed in claim 1 wherein the first and second array element electrodes and the reference electrode are co-planar with one another.

12. A device as claimed in claim 10 wherein the reference electrode is disposed over the insulator layer.

13. A device as claimed in claim 1 and comprising a hydrophobic layer disposed over the array element electrodes but not over the reference electrode.

14. An AM-EWOD device comprising:

a plurality of array element electrodes disposed on a first substrate and defining respective array elements in the AM-EWOD device;

a reference electrode disposed on the first substrate;

a sensor; and a reference electrode drive circuit;

wherein the reference electrode drive circuit is configured to drive the reference electrode with any one of a first voltage waveform for actuating an array element and a second voltage waveform different from the first voltage waveform when performing a sensing operation using the sensor;

the device further comprising an insulator layer disposed over the array element electrodes but not over the reference electrode, wherein the reference electrode is disposed over the insulator layer.

* * * * *